United States Patent [19]

Kubo et al.

[11] Patent Number: 5,742,732
[45] Date of Patent: Apr. 21, 1998

[54] DATA STREAM MULTIPLEXING APPARATUS AND METHOD AND RECORD MEDIUM THEREFOR

[75] Inventors: Yumiko Kubo; Teiichi Ichikawa, both of Kanagawa-ken, Japan

[73] Assignee: Kabushiki Kaisha Toshiba, Kawasaki, Japan

[21] Appl. No.: 658,824

[22] Filed: May 31, 1996

[30] Foreign Application Priority Data

May 31, 1995 [JP] Japan ................................ 7-134176

[51] Int. Cl.⁶ .................... H04N 5/92; H04N 7/12; H04N 11/02; H04N 11/04
[52] U.S. Cl. .................... 386/95; 386/109; 348/423
[58] Field of Search .................... 386/1, 33, 95, 386/109, 98, 111–112; 348/385, 387–388, 423, 461–468; H04N 5/92, 7/12, 11/02, 11/04

[56] References Cited

U.S. PATENT DOCUMENTS

| | | | |
|---|---|---|---|
| 4,794,465 | 12/1988 | Van Luyt et al. | 358/341 |
| 5,371,602 | 12/1994 | Tsuboi et al. | 358/335 |
| 5,400,077 | 3/1995 | Cookson et al. | 348/556 |
| 5,408,474 | 4/1995 | Wakamori et al. | 370/112 |
| 5,455,684 | 10/1995 | Fujinami et al. | 386/112 |
| 5,621,840 | 4/1997 | Kawamura et al. | 386/111 |

FOREIGN PATENT DOCUMENTS 7-059082  3/1995  Japan.

*Primary Examiner*—Thai Tran
*Assistant Examiner*—Vincent F. Boccio
*Attorney, Agent, or Firm*—Cushman Darby & Cushman IP Group of Pillsbury Madison & Sutro LLP

[57] ABSTRACT

A data stream multiplexing apparatus having a stream modifier for producing modified sub-picture data stream from a sub picture data stream where a first sub-picture data unit containing pixel data forming a sub-picture image with a preset display time period is located along a time axis by additionally locating at least one of second sub-picture data unit having almost same contents as the first sub-picture data unit within the display time period of the first sub-picture data unit on the sub-picture data stream, and a multiplexer responsive to input modified sub-picture data stream produced by the stream modifying means and other data streams reproduced in synchronous with the modified sub-picture data stream, for multiplexing these streams after packetizing them by a prescribed length.

18 Claims, 13 Drawing Sheets

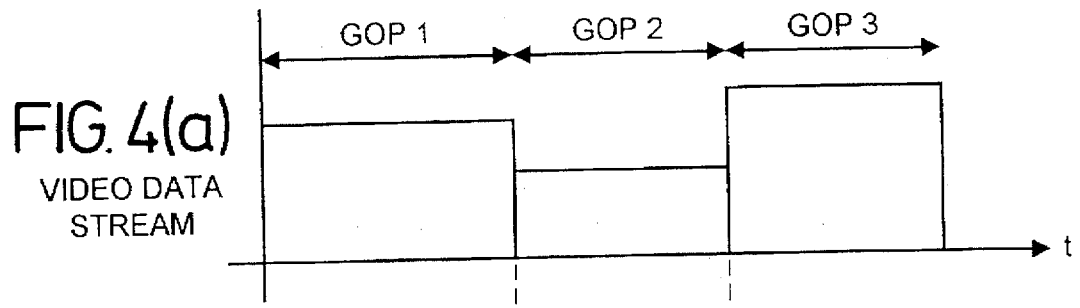
FIG. 4(a) VIDEO DATA STREAM
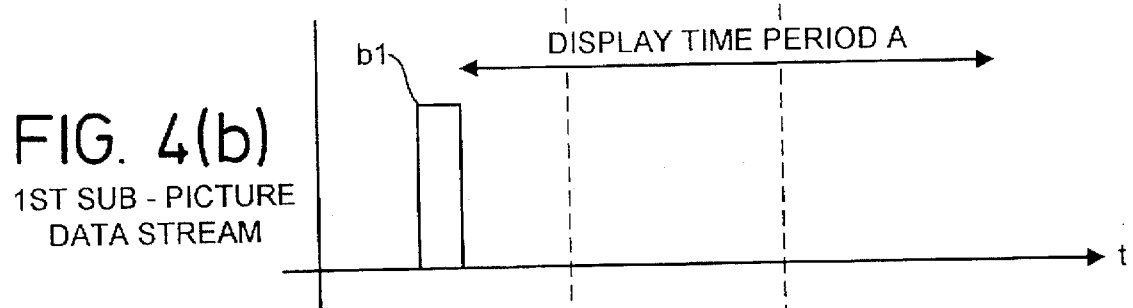
FIG. 4(b) 1ST SUB-PICTURE DATA STREAM
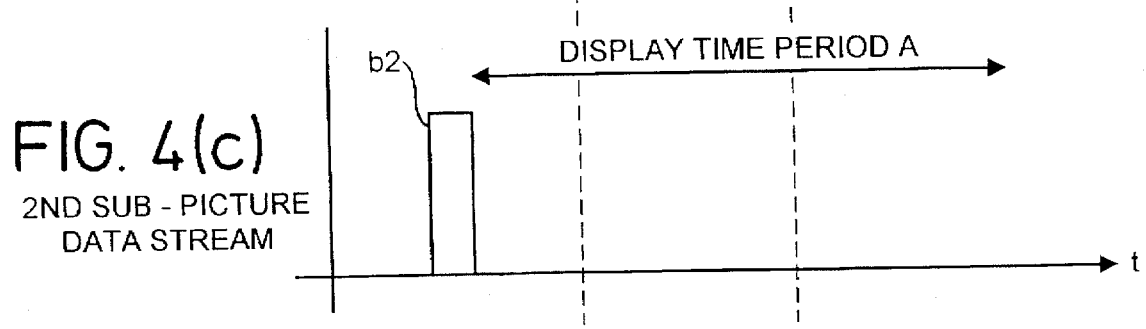
FIG. 4(c) 2ND SUB-PICTURE DATA STREAM

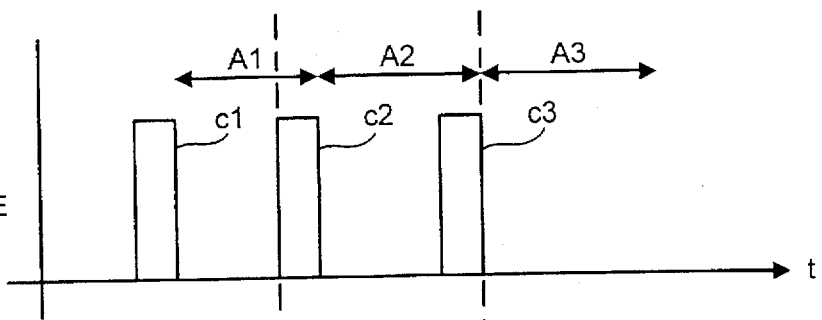
FIG. 4(d) MODIFIED 1ST SUB-PICTURE DATA STREAM
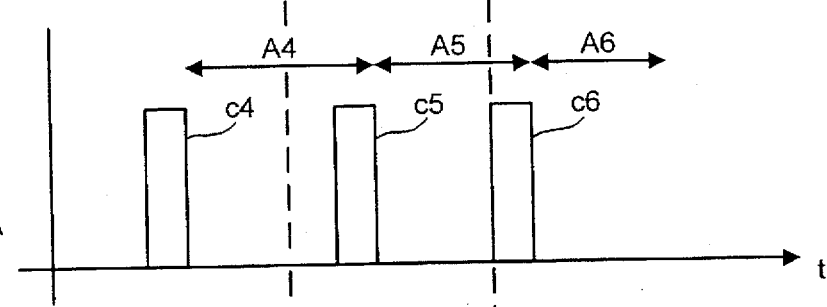
FIG. 4(e) MODIFIED 2ND SUB-PICTURE DATA STREAM
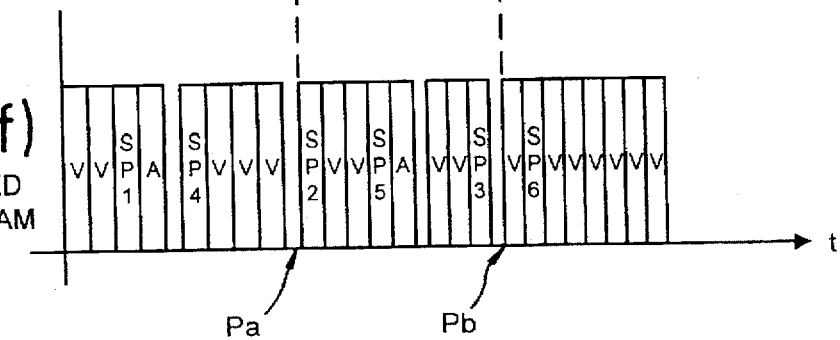
FIG. 4(f) INTEGRATED DATA STREAM

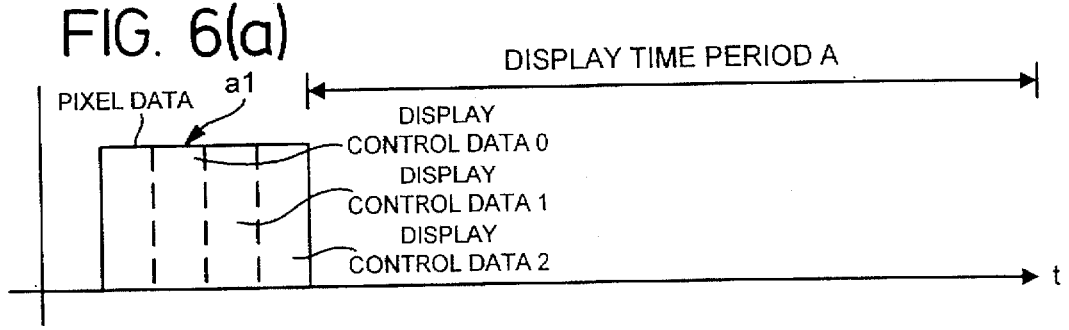
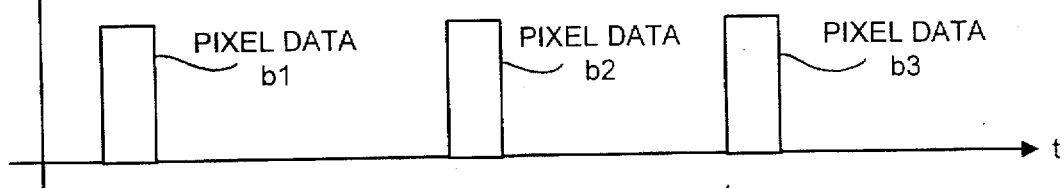
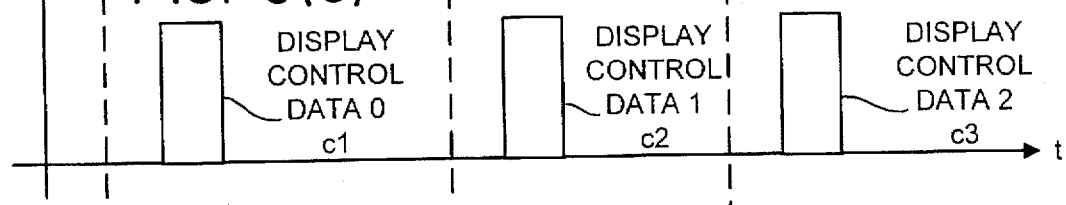
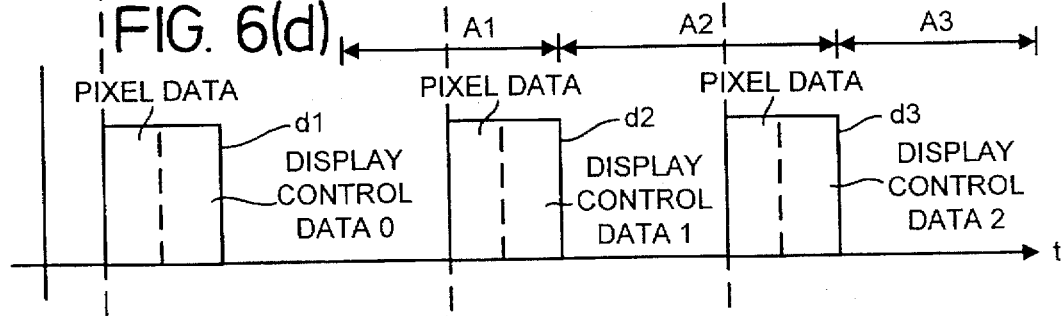
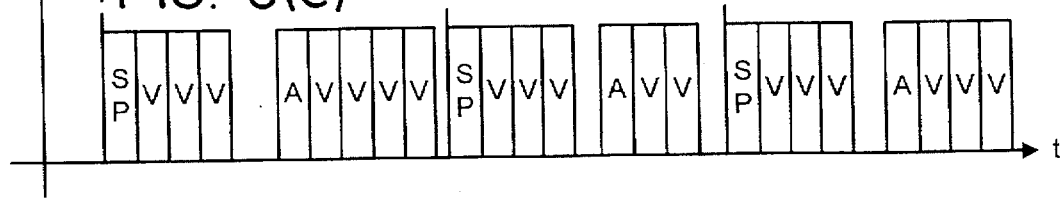

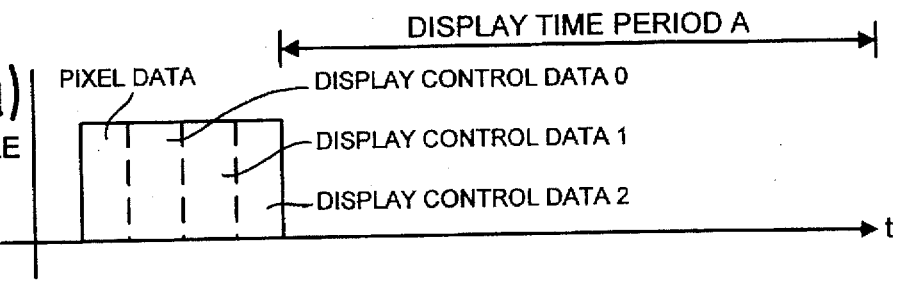
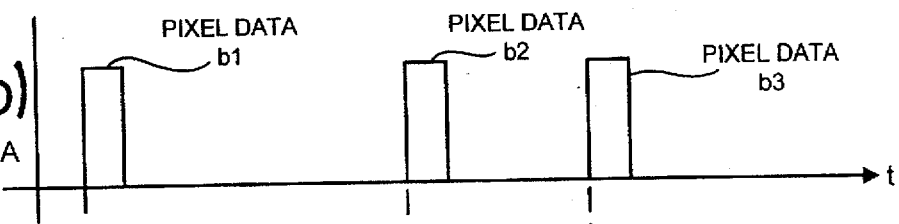
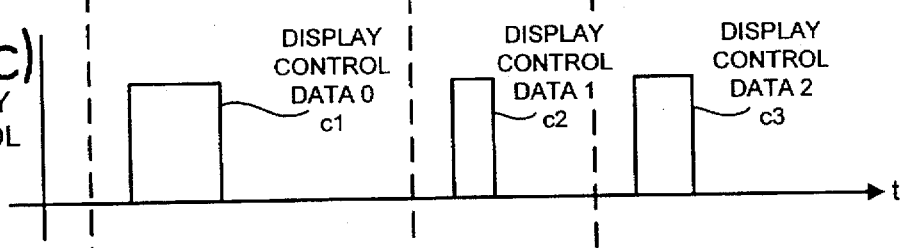
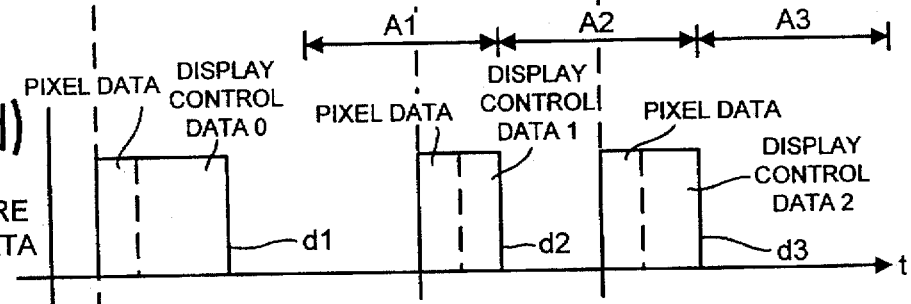
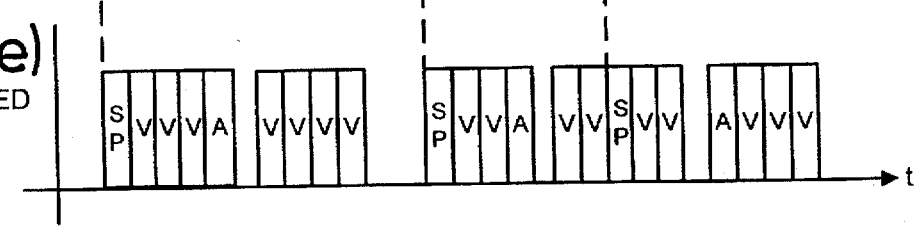

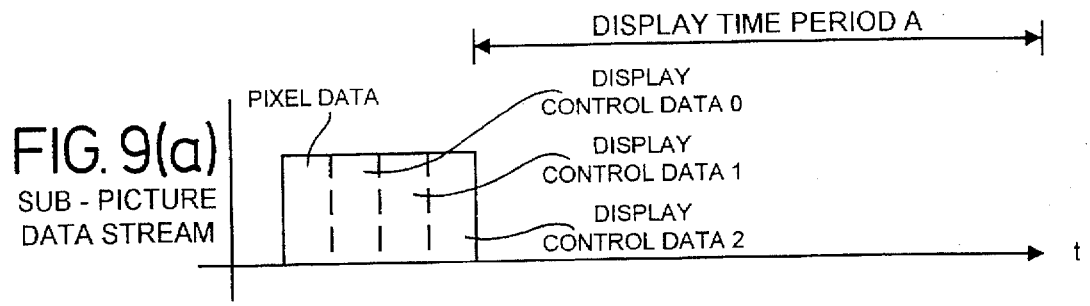
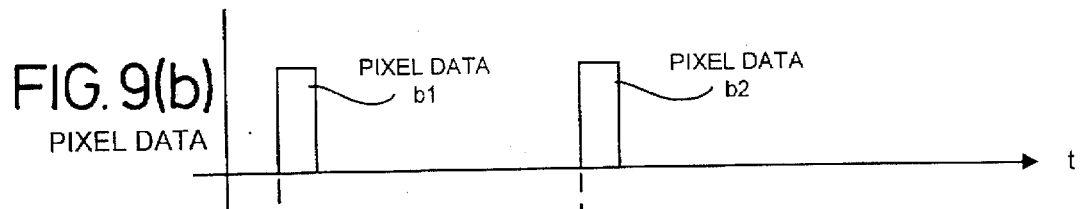
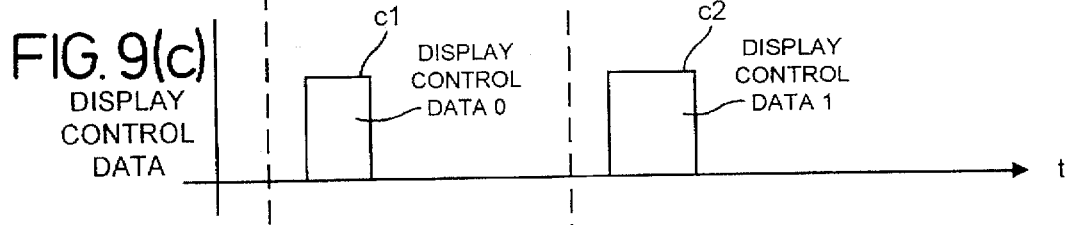
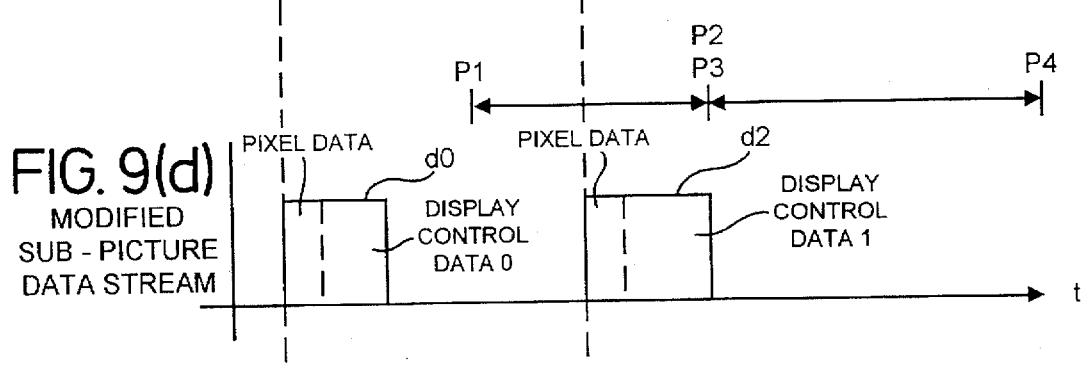
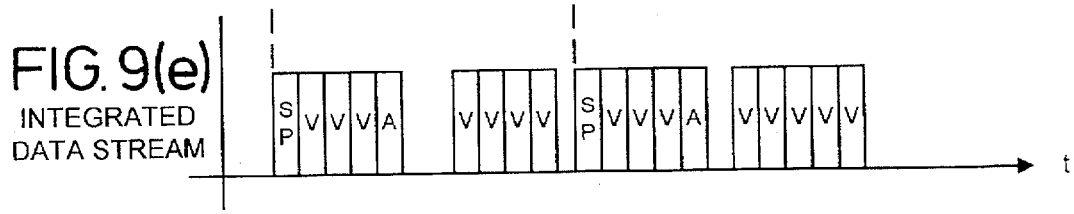

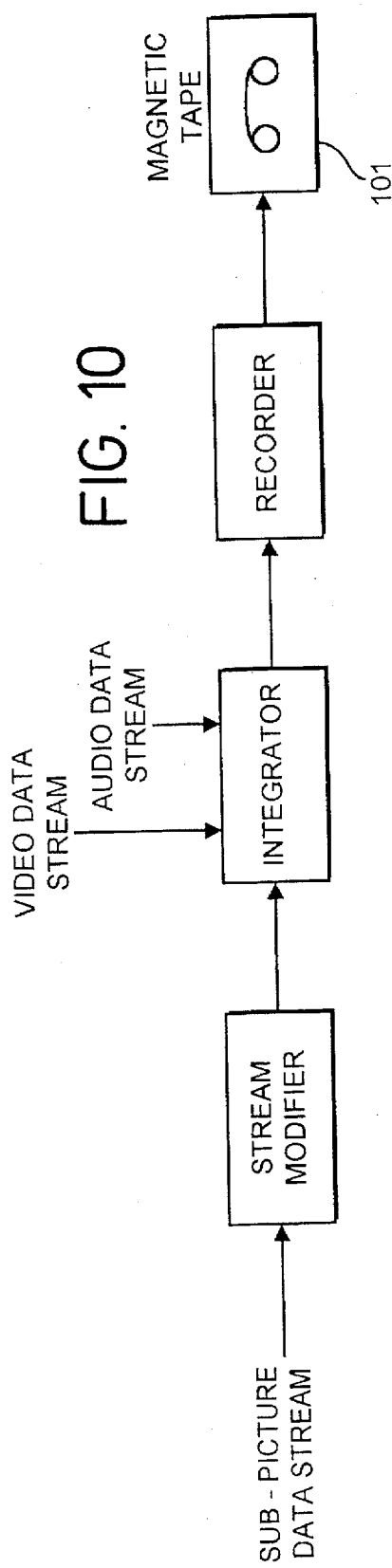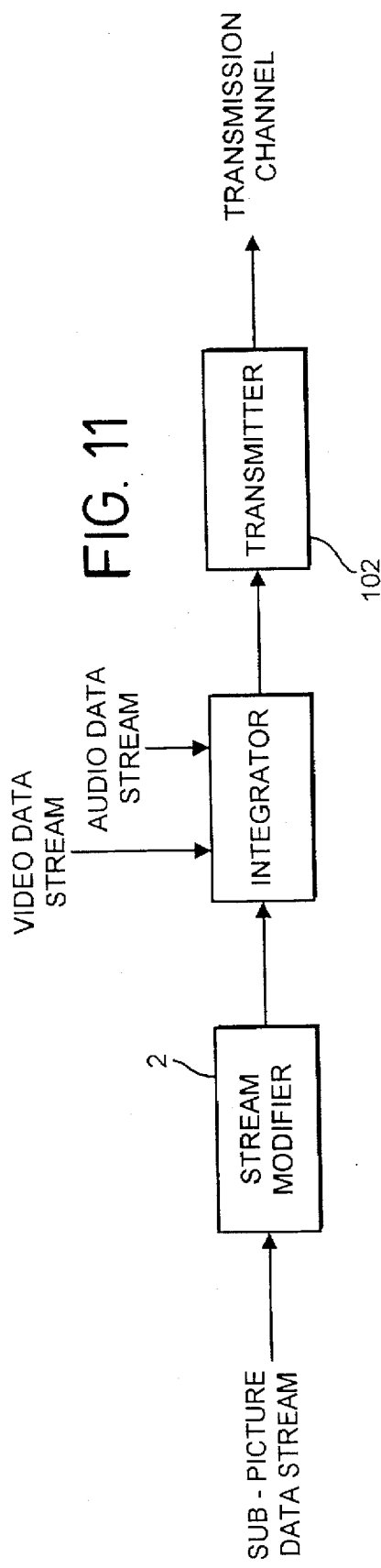

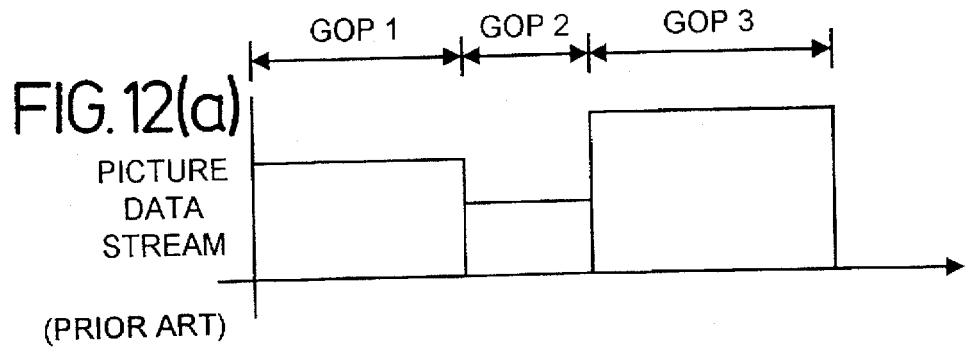
FIG.12(a) PICTURE DATA STREAM
(PRIOR ART)
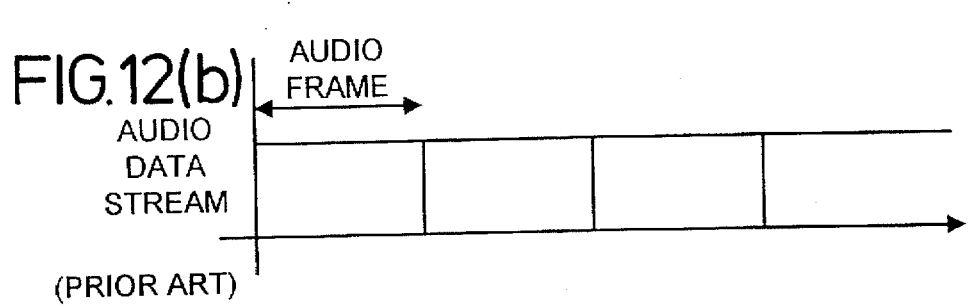
FIG.12(b) AUDIO DATA STREAM
(PRIOR ART)
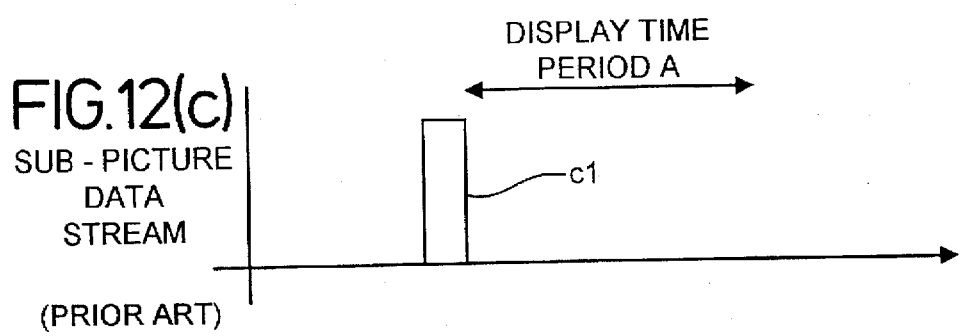
FIG.12(c) SUB-PICTURE DATA STREAM
(PRIOR ART)
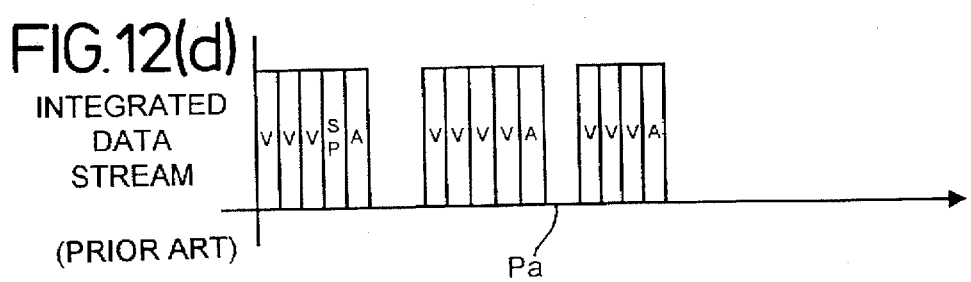
FIG.12(d) INTEGRATED DATA STREAM
(PRIOR ART)

DATA STREAM MULTIPLEXING APPARATUS AND METHOD AND RECORD MEDIUM THEREFOR

FIELD OF THE INVENTION

The present invention generally relates to a data stream multiplexing apparatus and method for producing an integrated data stream by multiplexing different data streams such as a picture data stream, an audio data stream and a sub-picture data stream. The present invention also relates to a record medium such as a disc for recording such an integrated data stream.

BACKGROUND OF THE INVENTION

As a method for multiplexing different types of data stream, an MPEG-2 system layer is known in the art. According to the MPEG-2 system different types of data streams such as a picture data stream, an audio data stream and a sub-picture data stream are split by a prescribed length. The split pieces of data stream are then multiplexed together into an integrated data stream (so-called as a system stream) in a packet batch. The conventional data stream multiplexing system of the MPEG-2 system layer will be explained hereinafter in reference to FIGS. 12(a) to 12(d).

FIG. 12(a) shows an MPEG-2 system picture data stream "a" whose bit rate is variable in every GOP. FIG. 12(b) shows an audio data stream "b" whose bit rate is fixed. FIG. 12(c) shows a sub-picture data stream "c". The sub-picture data is an auxiliary data to the picture data, such as a captain of movie or lyric letters in karaoke system display image. As shown in FIG. 12(c), the sub-picture data stream "a" includes therein a sub-picture data unit c1 containing pixel data and display time period information of one picture image. In FIGS. 12(a) to 12(d), the sub-picture data unit c1 has a display time period A, it is displayed in the reproduction time periods of three GOPs (GOP1 through GOP3) of the picture data stream "a".

FIG. 12(d) shows the integrated data stream "d" which is obtained by packetizing the data streams and multiplexing them. Here, as mentioned above, since the sub-picture data unit c1 is displayed in the reproduction time periods of three GOPs (GOP1 through GOP3) of the picture data stream "a" the sub-picture data packet SP in the integrated data stream "d" is located before the leading GOP1 among the three GOPs.

The picture data, the audio data and the sub-picture data in the integrated data stream "d" are separated in a system decoder 51 in every packet based on the data type information given in their headers, as shown in FIG. 13. The individual data are output as respective data streams through their corresponding input buffers 52, 53 and 54.

By the way, the integrated data stream "d" is not always reproduced from its leading position. For instance, when the channel is changed in the transmission and when the reproduction is return from the special reproduction to the normal reproduction in the recording reproduce apparatus such as the disc a reproduction of stream starts from a halfway of the stream. In this case, for example when the reproduction of stream starts from the position Pa in FIG. 12(d), since the sub-picture data packet is located before the position Pa the sub-picture image to be displayed can not be displayed.

As described above, the conventional data stream multiplexing apparatus, streams multiplexing method and the record medium have a problem that in the stream obtained by packetizing the streams containing a plurality of sub-picture data and multiplexing in a unit of packet, when a reproduction of stream starts from the position which is after the position of the sub-picture data packet it is impossible to display the sub-picture image in the display time period of the sub-picture data unit.

SUMMARY OF THE INVENTION

It is, therefore, an object of the present invention to provide a data stream multiplexing apparatus, data stream multiplexing method and the record medium which is able to extensively shorten the required latency time for displaying sub-picture image when a reproduction of stream starts from a halfway of the stream.

In order to achieve the above object, a data stream multiplexing apparatus according to a first aspect of the present invention includes a stream modifier for producing modified sub-picture data stream from a sub-picture data stream where a first sub-picture data unit containing pixel data forming a sub-picture image with a preset display time period is located along a time axis by additionally locating at least one of second sub-picture data unit having almost same contents as the first sub-picture data unit within the display time period of the first sub-picture data unit on the sub-picture data stream, and a multiplexer responsive to input modified sub-picture data stream produced by the stream modifying means and other data streams reproduced in synchronous with the modified sub-picture data stream, for multiplexing these streams after packetizing them by a prescribed length.

Further the stream modifier may additionally locate the second sub-picture data unit on the sub-picture data stream as it splits the display time period of the first sub-picture data unit to a plurality of almost equal display time periods.

A data stream multiplexing apparatus according to second aspect of the present invention is provided with a separator responsive to input sub-picture data streams located along its time axis with first sub-picture data unit having pixel data forming the sub-picture image with a preset display time period and control data for controlling the display of the sub-picture image in accordance with a display time, for separating the pixel data and the control data, a control data splitter for splitting the control data units separated by the separator, a stream modifier for producing modified sub-picture data stream from a sub-picture data stream where a first sub-picture data unit containing pixel data forming a sub-picture image with a preset display time period is located along a time axis by additionally locating at least one of second sub-picture data unit having almost same contents as the first sub-picture data unit within the display time period of the first sub-picture data unit on the sub-picture data stream, and a multiplexer responsive to input modified sub-picture data stream produced by the stream modifying means and other data streams reproduced in synchronous with the modified sub-picture data stream, for multiplexing these streams after packetizing them by a prescribed length.

Further the control data splitter may be constructed to split the control data units by almost equal data amounts or almost equal display control time periods.

A data stream multiplexing method according to a third aspect of the present invention comprises the steps of producing a modified sub-picture data stream from a sub-picture data stream located along its time axis with a first sub-picture data unit containing pixel data forming a sub-picture image with a preset display time period by additionally locating at least one of second sub-picture data units having almost same contents as the first sub-picture data unit within the display time period of the first sub-picture data unit on the sub-picture data stream, and multiplexing the modified sub-picture data streams and other data streams reproduced in synchronous with the modified sub-picture data stream after packetizing them by a prescribed length.

A data stream multiplexing method according to a fourth aspect of the present invention comprises the steps of separating the pixel data and the control data, in response to input sub picture data streams located along its time axis with first sub-picture data unit having pixel data forming the sub-picture image with a preset display time period and control data for controlling the display of the sub-picture image in accordance with a display time, splitting the separated control data in units, coupling the control data units with the pixel data to form some second sub-picture data units, producing a modified sub-picture data streams from a sub-picture data stream where a first sub-picture data unit containing pixel data forming a sub-picture image with a preset display time period is located along a time axis by additionally locating at least one of second sub-picture data unit having almost same contents as the first sub-picture data unit within the display time period of the first sub-picture data unit on the sub-picture data stream, and multiplexing the modified sub-picture data streams with other data streams reproduced in synchronous with the modified sub-picture data stream after packetizing them by a prescribed length.

According to a fifth aspect of the present invention, a record medium for recording a sub-picture data stream located along its time axis with sub-picture data units containing pixel data forming a sub-picture image with a preset display time period and other data streams reproducible in synchronous with the sub-picture data stream by multiplexing them after packetizing them by a prescribed length is characterized by that at least a part of a plurality of consecutive sub-picture data units located on the multiplexed streams by packetizing includes a preceding first sub-picture data unit and a second sub-picture data unit with packets located in the display time period of the first sub-picture data unit, the first and second sub-picture data units have the same pixel data, and the display time periods are substantially contiguous.

According to a sixth aspect of the present invention, a record medium for recording sub-picture data streams located along its time axis with first sub-picture data unit having pixel data forming the sub-picture image with a preset display time period and control data for controlling the display of the sub-picture image in accordance with a display time and other data streams reproducible in synchronous with the sub-picture data stream by multiplexing them after packetizing them by a prescribed length is characterized by that at least a part of a plurality of consecutive sub-picture data units located on the multiplexed streams by packetizing includes a preceding first sub-picture data unit and a second sub-picture data unit with packets located in the display time period of the first sub-picture data unit, the first and second sub-picture data units have the same pixel data, and the valid time periods of the display time periods are substantially contiguous.

In the present invention, by locating the sub-picture data packets group produced from the modified sub-picture data stream which is constructed by additionally locating at least one of second sub-picture data units which has the same contents as the sub-picture data unit for instance, has the same pixel data and the substantially consecutive display time periods in the display time period of the sub-picture data unit (first sub-picture data unit) on the sub-picture data stream on the multiplexed stream, even when a reproduction of stream starts from a halfway of the stream it is possible to display the sub-picture image by the sub-picture data packet which is located after the reproduction starting position of the stream.

Further, in the present invention, by splitting one unit of the control data for controlling the display of the sub-picture image according to the display time into some sub-picture data units and locating the sub-picture data packets group produced from the sub-picture data units on the multiplexed stream, even when a reproduction of stream starts from a halfway of the stream it is possible to display the sub-picture image by the sub-picture data packet located after the reproduction stating position of the stream and also to reduce the size of the input buffer required to the decoder.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 4(a) through 4(f) are timing charts showing streams in the second embodiment of data stream multiplexing apparatus;

FIGS. 6(a) through 6(e) are timing charts showing streams in the third embodiment of data stream multiplexing apparatus;

FIGS. 7(a) through 7(e) are timing charts showing streams in a fourth embodiment of data stream multiplexing apparatus;

FIGS. 9(a) through 9(e) are timing charts showing streams in a fifth embodiment of data stream multiplexing apparatus;

FIG. 10 is a block diagram showing a sixth embodiment of the present invention;

FIG. 11 is a block diagram showing a seventh embodiment of the present invention;

FIGS. 12(a) through 12(e) are timing charts showing data streams in a conventional data stream multiplexing system.

DESCRIPTION OF THE PREFERRED EMBODIMENTS

The present invention will be described in detail with reference to the FIGS. 1 through 11.

Figure 1:
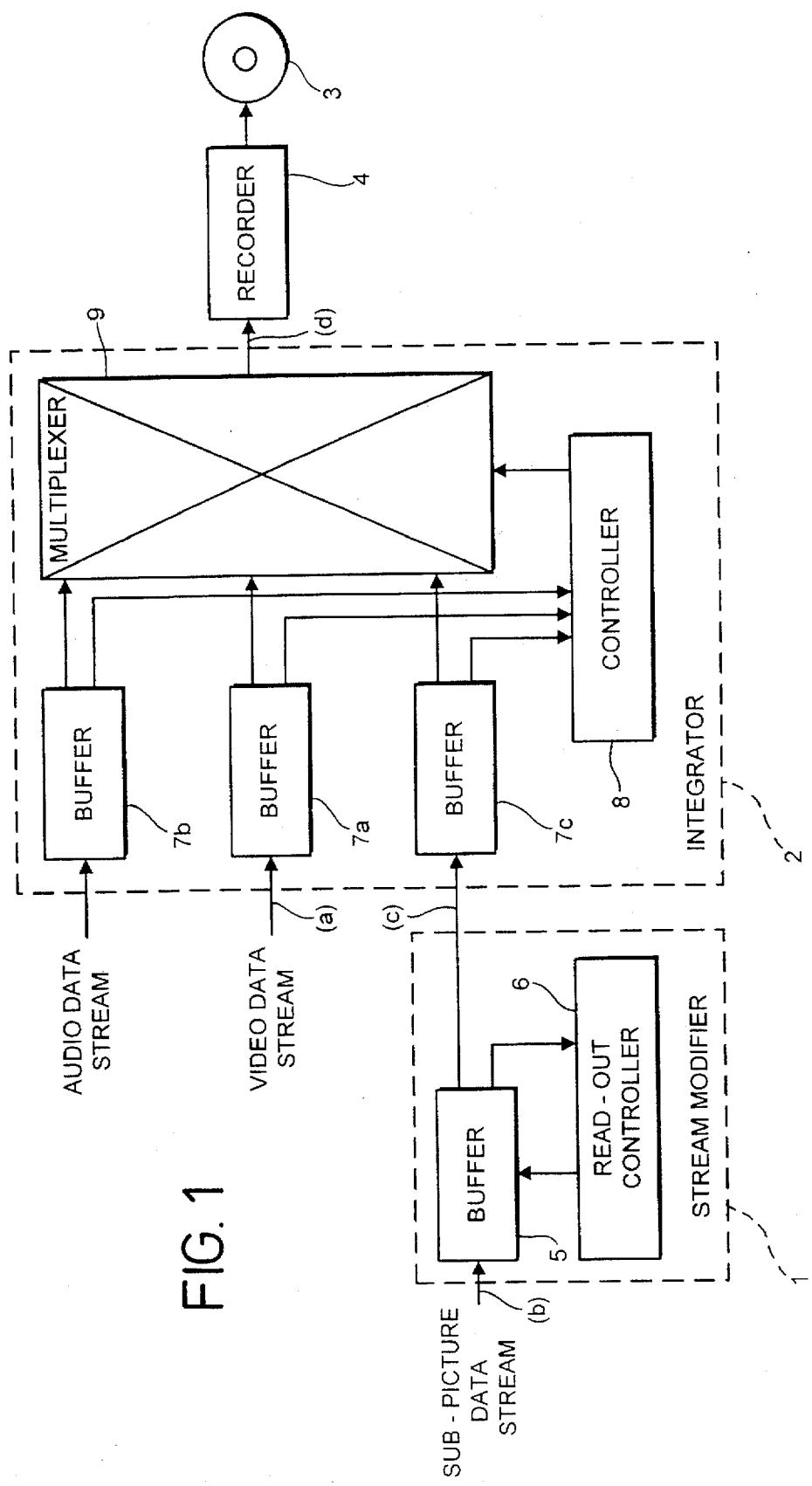
FIG. 1 is a block diagram showing a first embodiment of data stream multiplexing apparatus according to the present invention.
Figure 2:
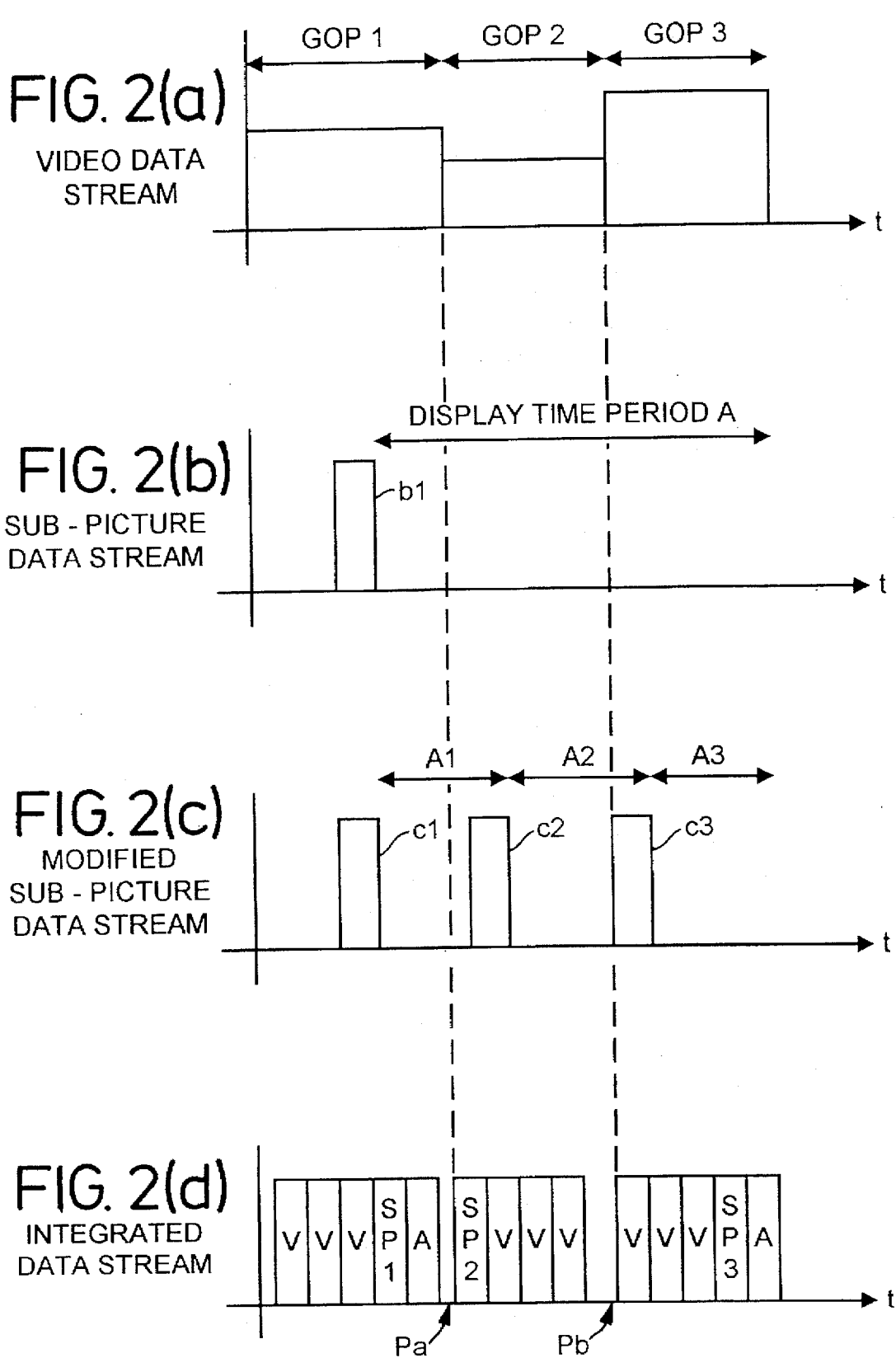
FIGS. 2(a) through 2(d) are timing charts showing streams in the first embodiment of data stream multiplexing apparatus.

FIG. 1 shows a construction of the first embodiment, the data stream multiplexing apparatus.

As shown in FIG. 1, the data stream multiplexing apparatus according to the present invention is comprised of a stream modifier 1 for producing a modified sub-picture data stream which is constructed by additionally locating data unit having almost the same content as the sub-picture data unit in the display time period of the sub-picture data unit on the sub-picture data stream from the input sub-picture data stream, an integrator 2 for producing the integrated data stream by packetizing the picture data stream, audio data stream and modified sub-picture data stream by a prescribed length and multiplexing them and a recorder 4 for recording the integrated data stream in the record medium 3 such as the disc.

FIGS. 2(a) to 2(d) show streams in multiplexing operation of the data stream multiplexing apparatus according to the present invention.

FIG. 2(a) shows an MPEG-2 picture data stream. FIG. 2(b) shows a sub-picture data stream. FIG. 2(c) shows a modified sub-picture data stream. FIG. 2(d) shows an integrated data stream. Here, the sub-picture data stream locates the sub-picture data unit b1 containing the pixel data and display time period information of one picture image is located on every sub-picture image. In FIGS. 2(a) to 2(d), the sub-picture data unit b1 has the display time period A and it is displayed during the reproduction time period of three GOPs (GOP1 through GOP3) on the picture data stream.

The embodiment of the data stream multiplexing system is explained hereinafter in detail referring to FIG. 1 and FIGS. 2(a) to 2(d).

The stream modifier 1 stores the sub-picture data stream, when it is input, in the buffer 5 and also send it to the integrator 2. The stream modifier 1 reads in the display time period information from the sub-picture data unit b1 stored in the buffer 5 in the read-out controller 6 and judges if the display time period A exceeds the reference value or not. When the display time period A exceeds the reference value, the read-out controller 6 settles the display time periods A1, A2 and A3 which are split from the displaying time period A. For instance, the display time period A is split by almost equal display time periods A1, A2 and A3.

Then, the sub-picture data unit b1 is read out from the buffer 5 as a sub-picture data unit c2 of the second display time period A2 and it is forwarded to the integrator 2 by making a change necessary to the display time period information of it (the display starting time is changes when the display time period information is comprised of the display starting time and the display ending time). Then, the sub-picture data unit is read out again from the buffer 5 as a sub-picture data unit c3 of the third display time period A3, and it is send to the integrator 2 by making the change to the display time period information. Accordingly, as shown in FIG. 2(c) the modified sub-picture data stream comprised of the sub-picture data units c1, c2 and c3 which follows the leading picture-data unit b1 is obtained.

On the other hand, the picture data stream, the audio data stream and the modified sub-picture data stream input to the integrator 2 are stored in their corresponding buffers 7a, 7b and 7c. Then, these streams stored in the buffers 7a, 7b and 7c are read out by a prescribed length of units under the control of the controller 8 and packetized. The packet data are multiplexed in the multiplexer 9 according to their locations settled by the controller 8, output by being the integrated data stream as shown in FIG. 2(d) and recorded in the disc 3 by the recorder 4.

In the integrated data stream obtained by the data stream multiplexing system, the sub-picture data packets SP1 through SP3 are located in the time periods of three GOPs (GOP1 through GOP3) in the picture data stream. Therefor, even when a reproduction of stream starts from the position Pa or Pb on the integrated data stream shown in FIG. 2(d) for instance it is possible to display the sub-picture image by the sub-picture data packet SP2 or SP3.

According to the embodiments of the data stream multiplexing method of the present invention, by additionally locating the data unit which is almost same as the sub-picture data unit in the display time period of the sub-picture data unit on the sub-picture data stream it is possible to shorten the required latency time to display a sub-picture image into about a fixed short time when a reproduction of stream starts from a halfway of the stream.

Here, the sub-picture data packets in the integrated data stream are not always located in all of the time periods of the GOPs, it may be located in the time period of any of the GOPs within the display time period A of the sub-picture data unit, or it may be located by scattered in the time periods of a plurality of GOPs. And further the display time period may be split into several numbers in response to the length of the display time period A.

Next, the second embodiment of the data stream multiplexing apparatus according to the present invention will be explained.

Figure 3:
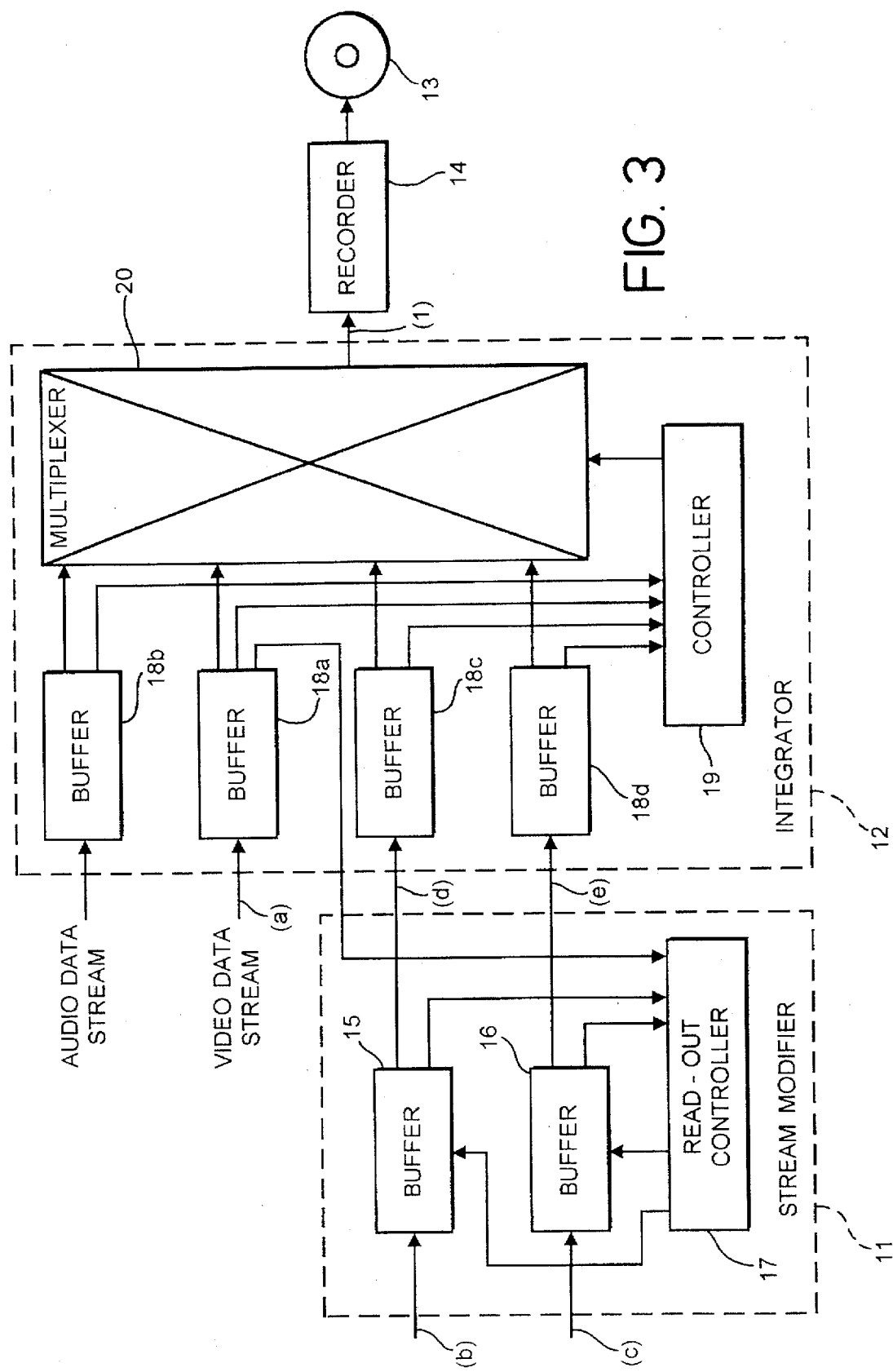
FIG. 3 is a block diagram showing a second embodiment of data stream multiplexing apparatus according to the present invention.

FIG. 3 shows the construction of the second embodiment of the data stream multiplexing apparatus.

As shown in FIG. 3, the second embodiment of the data stream multiplexing apparatus is comprised of a stream modifier 11 for producing the modified sub-picture data stream which is constructed from the input sub-picture data streams by additionally locating the data unit which is the same as the sub-picture data unit in the display time period of the sub-picture data unit on the sub-picture data stream, an integrator 12 for producing an integrated data stream by packetizing the picture data stream, the audio data stream and the modified sub-picture data streams by a prescribed length and multiplexing them, and a recorder 14 for recording the integrated data stream to the record medium 13 such as the disc.

FIGS. 4(a) to 4(f) show streams in the data stream multiplexing process according to the second embodiment of the data stream multiplexing apparatus.

FIG. 4(a) shows an MPEG-2 picture data stream, which bit rate is variable every 1 GOP. FIGS. 4(b) and 4(c) show a first sub-picture data stream and a second sub-picture data stream for a multilingual. FIGS. 4(d) and 4(e) show a first modified sub-picture data stream and a second modified sub-picture data stream. And FIG. 4(f) shows an integrated data stream.

The first sub-picture data stream and the second sub-picture data stream locate sub-picture data units b1 and b2 containing pixel data and display time period information constituting one sub-picture image. The data amounts are variable in every sub-picture image. In the drawing, the display time periods A of respective sub-picture data units b1 and b2 are same, and these are displayed in the reproduction time periods of the three GOPs (GOP1 through GOP3) of the picture data stream.

The operation of the second embodiment of the data stream multiplexing apparatus will be explained hereinafter referring to FIG. 3 and FIGS. 4(a) to 4(f). The stream modifier 11 stores the first and the second sub-picture data streams, when these are input, in the buffer 15 and 16 and also send them to the integrator 12. The stream modifier 11 reads in the display time period information from the sub-picture data units b1 and b2 stored in the buffers 15 and 16 in the read-out controller 17 and judges if the display time period A exceeds the reference value or not. When the display time period A exceeds the reference value, the read-out controller 17 controls the reading operations of the information of the data amount per unit of time of the sub-picture data streams and the bit rate of the picture data streams from the buffers 15, 16 and 18, settles the display time periods A1, A2, A3, A4, A5 and A6 of the sub-picture data units c1, c2, c3, c4, c5 and c6 in the modified sub-picture data streams to average the sum of the data amount of the sub-picture data units b1 and b2 per unit of time and that of the picture data stream based on the information.

Then, the sub-picture data units are read out as sub-picture data units c2 and c5 of the second display time periods A2 and A5 from the buffers 15 and 16 and these are forwarded to the integrator 12 by making a change necessary to the display time period information of them (the display starting time is changed when the display time period information is comprised of the display starting time and the display ending time). Then, the sub-picture data units are read out again from the buffers 15 and 16 as sub-picture data units c3 and c6 of the third display time periods A3 and A6, and these are forwarded to the integrator 12 by making the change to the display time period information. Accordingly, the modified sub-picture data streams, as shown in FIGS. 4(d) and 4(e), are obtained.

On the other hand, the picture data stream, the audio data stream, and the modified sub-picture data streams input to the integrator 12 are stored in their corresponding buffers 18a, 18b, 18c and 18d. Then, these streams stored in the buffers 18a through 18d are read out by a prescribed length under the control of the controller 19 and packetized. The packet data are multiplexed in the multiplexer 20 according to the their locations settled by the controller 19, output by being the integrated data stream as shown in FIG. 4(f) and recorded in the disc 13 by the recorder 14.

In the integrated data stream obtained by the data stream multiplexing system, two of the sub-picture data packets SP1 through SP6 are located in the leading GOP1 of the picture data stream, three of them are located in the time periods of the next GOP2 which bit rate is comparatively low, and one of them are located in the time periods of next GOP3 which has comparatively high bit rate. Therefor, even when the reproduction of stream starts from the position Pa or Pb on the integrated data stream shown in FIG. 4(d) for instance, it is possible to display the sub-picture image by the data of the sub-picture data packets SP2, SP5, SP3 and SP6.

Next, the third embodiment of the data stream multiplexing apparatus according to the present invention will be explained.

Figure 5:
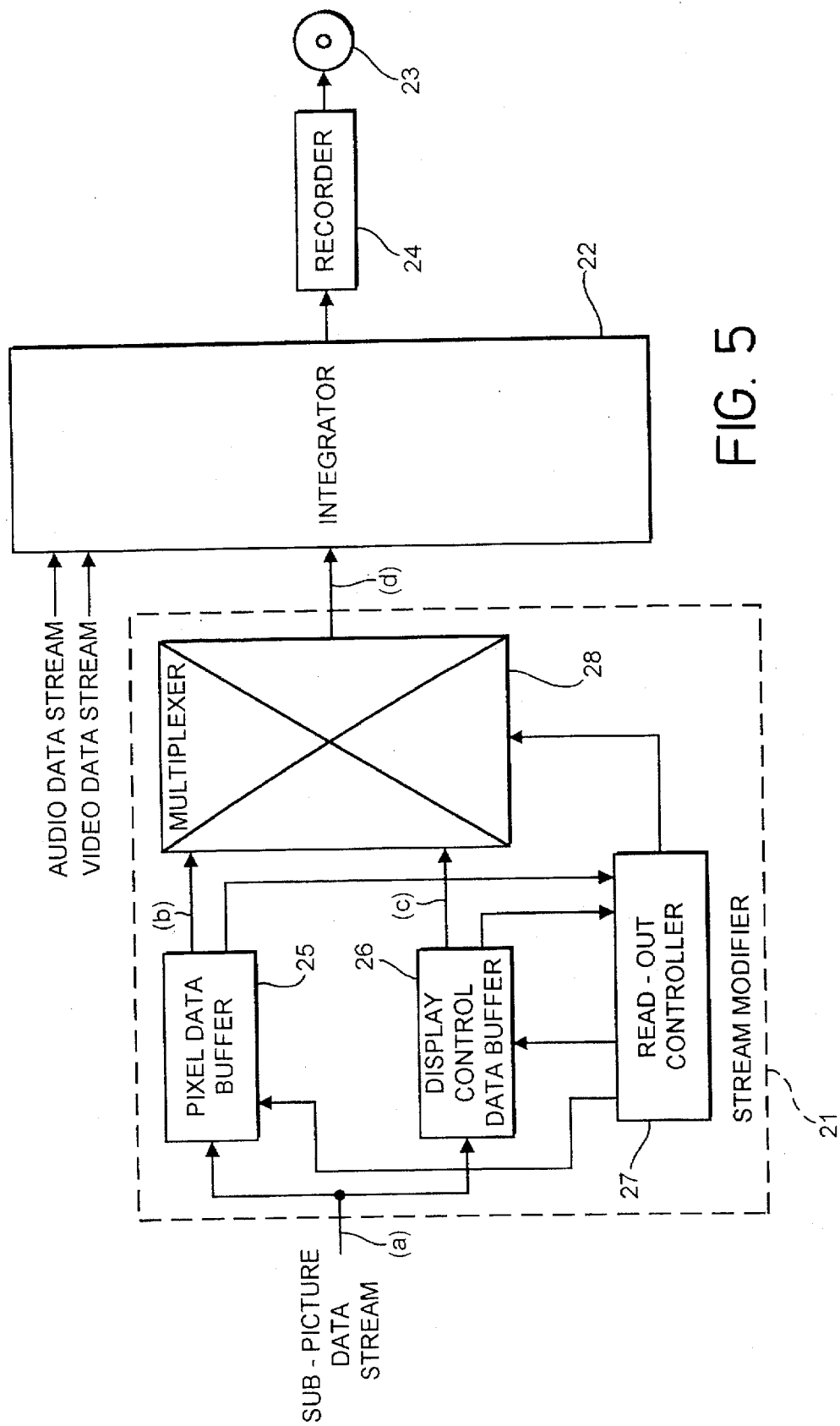
FIG. 5 is a block diagram showing a third embodiment of data stream multiplexing apparatus according to the present invention.

FIG. 5 shows the construction of the third embodiment of the data stream multiplexing apparatus. FIGS. 6(a) to 6(e) show streams in the data stream multiplexing process according to the third embodiment of the data stream multiplexing apparatus.

FIG. 6(a) shows a sub-picture data stream. The sub-picture data stream is constructed by locating the sub-picture data unit a1 containing the pixel data forming the sub-picture image and the display control data 0, 1 and 2 for changing a coloring emphasis or a location indicator of the sub-picture image as the time passes on every sub-picture image. These display control data have information concerning the display time periods, such as the time of performing the display controls.

Referring now to FIG. 5 and FIGS. 6(a) to 6(e), the third embodiment of the data stream multiplexing system will be explained hereinafter. When the sub-picture data stream is supplied, the stream modifier 21 stores the sub-picture data unit a1 of the sub-picture data stream as shown in FIG. 6(a) into the buffers 25 and 26 by separating it into the pixel data and the display control data. Then, the stream modifier 21 selectively picks up the information about the display time periods and the display control data amount from the display control data stored in the buffer 26 with the read-out controller 27. Then, as shown in FIGS. 6(a) and 6(c), it reads out the display control data c1, c2 and c3 from the buffer 26 by splitting the display control data unit by almost equal data amounts within the display time period A. And correspondingly it also reads out the pixel data b1, b2 and b3 from the other buffer 25.

The pixel data and the display control data read out from the buffers 25 and 26 are coupled in a coupler 28, so that, the modified sub-picture data stream comprised of the some sub-picture data units d1, d2 and d3 are obtained as shown in FIG. 6(d). Here, A1, A2 and A3 represent display time periods of the sub-picture data units d1, d2 and d3. On the other hand, the integrator 22 produces the integrated data stream as shown in FIG. 6(a) by packetizing the input picture data stream and multiplexing them, the audio data stream and the modified sub-picture data stream. The integrated data stream is forwarded to the recorder 24, and recorded to the disc 23.

According to the third embodiment of the data stream multiplexing system, it is possible to shorten the required latency time to display a sub-picture image into about a fixed short time when a reproduction of stream starts from a halfway of the stream, in similar to the aforementioned first and second embodiments.

According to third embodiment of the data stream multiplexing system, it is also possible to reduce the size of the input buffer required to the decoder, by splitting the display control data unit into several pieces.

Next, the fourth embodiment of the data stream multiplexing apparatus according to the present invention will be explained.

In the aforementioned third embodiment the display control data unit was split to average these data amounts. However, in this fourth embodiment of the data stream multiplexing apparatus, the display control data is split to average the display time period of the sub-picture data units after the splitting, as shown in FIGS. 7(a) to 7(e).

That is, in this fourth embodiment the data stream multiplexing apparatus, the display control data unit is read out by splitting into display control data c1, c2 and c3 from the buffer so as to average the display time periods A1, A2 and A3 of the sub-picture data units after the splitting. Correspondingly the pixel data b1, b2 and b3 are repeatedly read out from the other buffer, based on the information about the display time periods in the display control data. And, by coupling (integrating) the display control data and the pixel data, the modified sub-picture data stream comprised of the sub-picture data units d1, d2 and d3, as shown in FIG. 7(d), is obtained. Then, the integrated data stream, as shown in FIG. 7(e), is produced by packetizing the picture data stream and multiplexing them, the audio data stream and the modified sub-picture data streams.

Next, the fifth embodiment of the data stream multiplexing apparatus according to the present invention will be explained.

Figure 8:
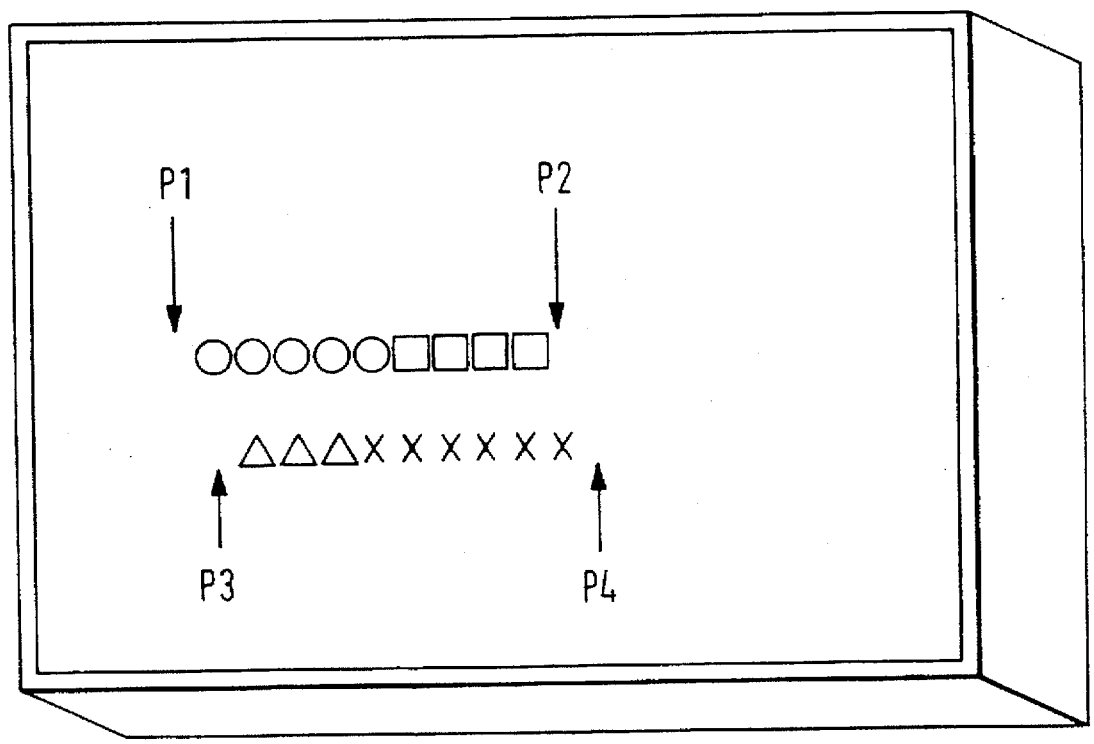
FIG. 8 is a display model of the lyric letters of karaoke (sub-picture image)
Figure 13:
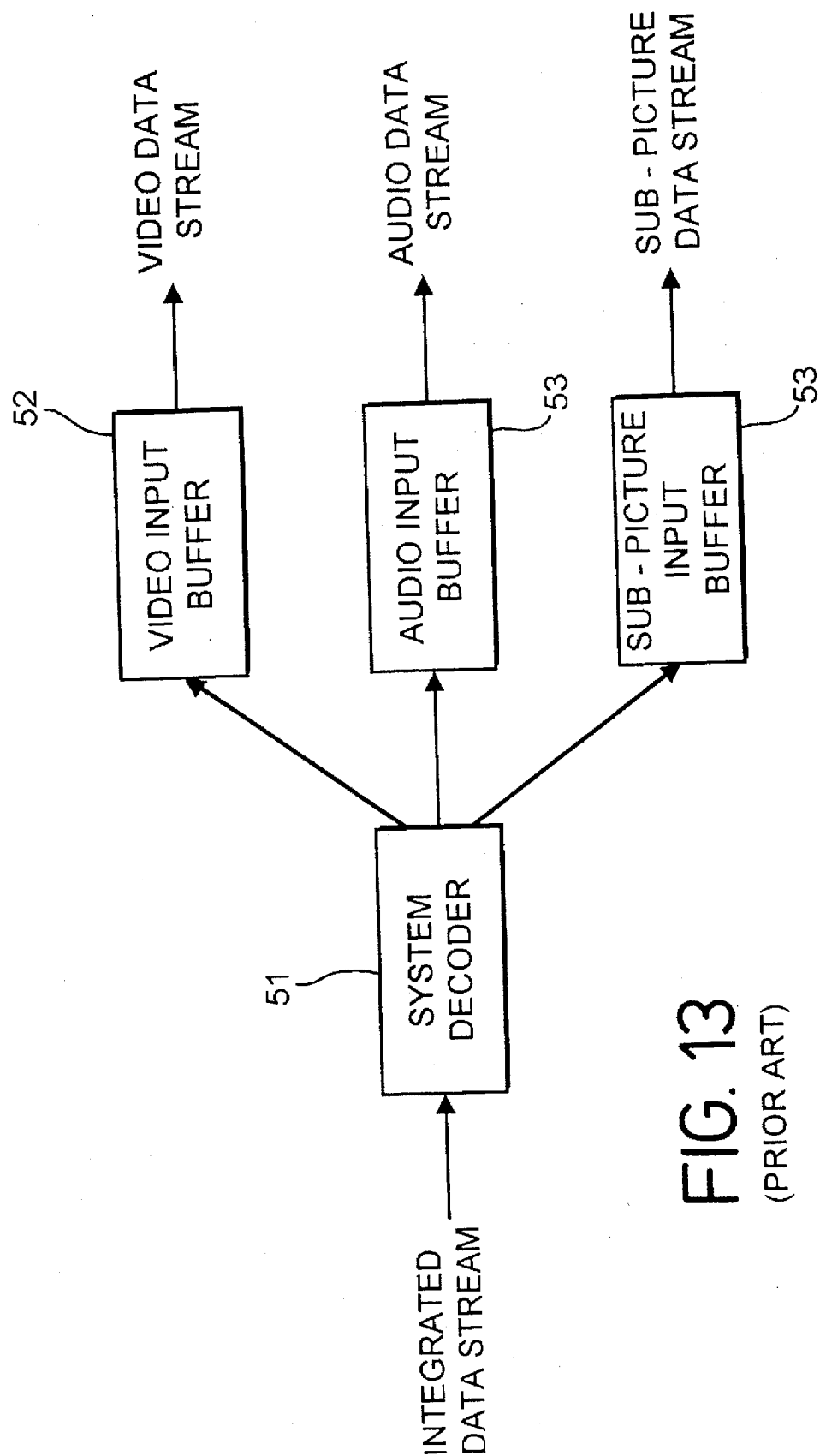
FIG. 13 is a block diagram showing the conventional data stream multiplexing system.

FIG. 8 shows the display model of the lyric letters of karaoke (a type of sub-picture data stream). Here, a coloring emphasis on the sub-picture image moves from a position P1 to next position P2 as the time passes, and further the coloring emphasis moves from a position P3 to next position P4.

In the fifth embodiment of the data stream multiplexing apparatus the display control data are split in every display control data which is subjected to every line of the sub-picture image.

In the fifth embodiment, as shown in FIGS. 9(a) to 9(e), the split display control data c1 and c2 are read out from their corresponding buffers, based on the information about positions subjected to the display controls in respective display control data. Correspondingly pixel data b1 and b2 are repeatedly read out from other buffers. By coupling (integrating) the display control data c1, c2 and the pixel data b1, b2, modified sub-picture data stream comprised of a plurality of sub-picture data units d1 and d2, as shown in FIG. 9(d), is obtained. Then, the integrated data stream, as shown in FIG. 9(e), is produced by packetizing the picture data streams and multiplexing them, the audio data streams and the video-modified streams.

In the above explanations, the present invention is adapted to an apparatus for recording an integrated data stream on a disc type record medium. However, the present invention can also be adapted to such an apparatus for recording an integrated data stream on a magnetic tape 101, as shown in FIG. 10, or other record medium such as a magnetic disc, an optical disc or a semiconductor memory.

As described above, since in the display time period of the sub-picture data unit (first sub-picture data unit) on the sub-picture data stream the sub-picture data packets group produced from the modified sub-picture data stream which is constructed by additionally locating at least one of second sub-picture data units having almost the same contents as the sub-picture data unit, for instance the same pixel data and also has substantially consecutive display time periods are located on the multiplexed stream, even when a reproduction of stream starts from a halfway of the stream it is possible to display the sub-picture image by the sub-picture data packet located after the reproduction stating position.

Further according to the present invention, since the control data unit for controlling the display of the sub-picture image according to the display time is split into a plurality of sub-picture data units and the sub-picture data packets group produced from respective sub-picture data units are located on the multiplexed stream, even when a reproduction of stream from the halfway of the stream it is possible to display the sub-picture image by the sub-picture data packets located after the reproduction stating position and also it is possible to reduce the size of input buffer which is demanded to the decoder.

As described above, the present invention can provide an extremely preferable data stream multiplexing apparatus, data stream multiplexing method and record medium therefor.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A data stream multiplexing apparatus, comprising:

stream a modifying means for producing modified sub-picture data stream from a sub picture data stream where a first sub-picture data unit containing pixel data forming a sub-picture image with a preset display time period is located along a time axis by additionally locating at least one of a second sub-picture data unit having almost the same contents as the first sub-picture data unit within the display time period of the first sub-picture data unit on the sub-picture data stream; and multiplexing means responsive to said modified sub-picture data stream produced by the stream modifying means and other data streams reproduced in synchronous with the modified sub-picture data stream, for multiplexing these streams after packetizing them by a prescribed length.

2. The data stream multiplexing apparatus as claimed in claim 1, wherein the stream modifying means additionally locates the second sub-picture data unit on the sub-picture data stream as it splits the display time period of the first sub-picture data unit to a plurality of almost equal display time periods.

3. The data stream multiplexing apparatus as claimed in claim 1, wherein the stream modifying means additionally locates the second sub-picture data unit on the sub-picture data stream as the sum of the data amount of the modified sub-picture data stream and the data amount of picture data stream which are other data streams per unit time is averaged.

4. The data stream multiplexing apparatus as claimed in any one of claims 1 through 3, wherein the data stream modifying means produces the modified sub-picture data stream when the display time period of the first sub-picture data unit exceeds a specific value.

5. A data stream multiplexing apparatus, comprising:

separating means responsive to input sub-picture data streams along a time axis with first sub-picture data unit having pixel data forming the sub-picture image with a preset display time period and control data for controlling the display of the sub-picture image in accordance with a display time, for separating the pixel data and the control data;

control data splitting means for splitting the control data units separated by the separating means;

stream a modifying means for producing modified sub-picture data stream from a sub-picture data stream where a first sub-picture data unit containing pixel data forming a sub-picture image with a preset display time period is located along a time axis by additionally locating at least one of second sub-picture data unit having almost the same contents as the first sub-picture data unit within the display time period of the first sub-picture data unit on the sub-picture data stream; and multiplexing means responsive to input modified sub-picture data stream produced by the stream modifying means and other data streams reproduced in synchronous with the modified sub-picture data stream, for multiplexing these streams after packetizing them by a prescribed length.

6. The data stream multiplexing apparatus as claimed in claim 5, wherein the control data splitting means splits the control data by almost equal data amounts.

7. The data stream multiplexing apparatus as claimed in claim 5, wherein the control data splitting means splits the control data units by almost equal display control time periods.

8. A data stream multiplexing method, comprising the steps of:

producing a modified sub-picture data stream from a sub-picture data stream along a time axis with a first sub-picture data unit containing pixel data forming a sub-picture image with a preset display time period by additionally locating at least one of second sub-picture data units having almost the same contents as the first sub-picture data unit within the display time period of the first sub-picture data unit on the sub-picture data stream; and multiplexing the modified sub-picture data streams and other data streams reproduced in synchronous with the modified sub-picture data stream after packetizing them by a prescribed length.

9. The data stream multiplexing method as claimed in claim 8, wherein the second sub-picture data unit is additionally located on the sub-picture data stream to split the display time period of the first sub-picture data unit by almost equal display time periods.

10. The data stream multiplexing method as claimed in claim 8, wherein the second sub-picture data unit is additionally located on the sub-picture data stream to average the sum of the data amounts per unit time of the modified sub-picture data streams and the other picture data streams.

11. The data stream multiplexing method as claimed in any one of preceeding claims 8 through 10, wherein the modified sub-picture data stream is produced when the display time period of the first sub-picture data unit exceeds a specific value.

12. A data stream multiplexing method, comprising the steps of:

separating the pixel data and the control data, in response to input sub-picture data streams located along its time axis with first sub-picture data unit having pixel data forming the sub-picture image with a preset display time period and control data for controlling the display of the sub-picture image in accordance with a display time;

splitting the separated control data into units;

coupling the control data units with the pixel data to form some second sub-picture data units;

producing a modified sub-picture data streams from a sub-picture data stream where a first sub-picture data unit containing pixel data forming a sub-picture image with a preset display time period is located along a time axis by additionally locating at least one of a second sub-picture data unit have almost the same contents as the first sub-picture data unit within the display time period of the first sub-picture data unit on the sub-picture data stream; and multiplexing the modified sub-picture data streams with other data streams reproduced in synchronous with the modified sub-picture data stream after packetizing them by a prescribed length.

13. The data stream multiplexing method as claimed in claim 12, wherein the control data units are split by almost equal data amounts.

14. The data stream multiplexing method as claimed in claim 12, wherein the control data units are split by almost equal display control time periods.

15. A record medium having a sub-picture data stream recorded along its time axis with sub-picture data units containing pixel data forming a sub-picture image with a preset display time period and other data streams reproducible in synchronous with the sub-picture data stream by multiplexing them after packetizing them by a prescribed length, characterized by that at least a part of a plurality of consecutive sub-picture data units located on the multiplexed streams by packetizing includes a preceeding first sub-picture data unit and a second sub-picture data unit with packets located in the display time period of the first sub-picture data unit, the first and second sub-picture data units have the same pixel data, and the display time periods are substantially contiguous.

16. A record medium having sub-picture data streams recorded along its time axis with first sub-picture data unit having pixel data forming a sub-picture image with a preset display time period and control data for controlling the display of the sub-picture image in accordance with a display time and other data streams reproducible in synchronous with the sub-picture data stream by multiplexing them after packetizing them by a prescribed length, wherein at least a part of a plurality of consecutive sub-picture data units located on the multiplexed streams by packetizing includes a preceeding first sub-picture data unit and a second sub-picture data unit with packets located in the display time period of the first sub-picture data unit, the first and second sub-picture data units have the same pixel data, and the valid time periods of the display time periods are substantially contiguous.

17. The record medium as claimed in claim 16, wherein the size of the display control data of the first sub-picture data unit and that of the second sub-picture data unit are almost the same.

18. The record medium as claimed in claim 16, wherein the valid time period of the display control data of the first sub-picture data unit and that of the second sub-picture data unit are almost the same.

* * * * *